(12) United States Patent
Brandao et al.

(10) Patent No.: US 7,583,223 B2
(45) Date of Patent: Sep. 1, 2009

(54) DISTRIBUTED AND CABLE REDUCED TCAS

(75) Inventors: Ruy C. Brandao, Redmond, WA (US); James B. Jones, Carnation, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/748,848

(22) Filed: May 15, 2007

(65) Prior Publication Data

US 2008/0068250 A1 Mar. 20, 2008

Related U.S. Application Data

(60) Provisional application No. 60/826,030, filed on Sep. 18, 2006.

(51) Int. Cl.
*G01S 13/93* (2006.01)
*G01S 13/74* (2006.01)

(52) U.S. Cl. ........................................................ 342/30

(58) Field of Classification Search ............. 342/29–32, 342/42–49, 63; 343/705, 708; 340/945–983; 701/120

See application file for complete search history.

(56) References Cited

U.S. PATENT DOCUMENTS

| 4,855,748 | A | | 8/1989 | Brandao et al. |
|---|---|---|---|---|
| 5,223,847 | A | | 6/1993 | Minter |
| 5,552,788 | A | | 9/1996 | Ryan et al. |
| 5,629,692 | A | * | 5/1997 | Stayton et al. ............... 340/961 |
| 6,222,480 | B1 | | 4/2001 | Kuntman et al. |
| 6,223,123 | B1 | | 4/2001 | Ryan et al. |
| 6,285,313 | B1 | * | 9/2001 | Wahab et al. ................ 342/174 |
| 6,999,022 | B1 | * | 2/2006 | Vesel et al. .................... 342/30 |
| 7,006,032 | B2 | | 2/2006 | King et al. |
| 7,436,350 | B1 | * | 10/2008 | Maloratsky et al. ........... 342/30 |

* cited by examiner

*Primary Examiner*—Thomas H Tarcza
*Assistant Examiner*—Cassi Galt
(74) *Attorney, Agent, or Firm*—Black Lowe & Graham, PLLC

(57) ABSTRACT

A direction finding antenna system for determining the relative bearing of a second aircraft from a first aircraft in conjunction with a Traffic Alert Collision Avoidance System (TCAS). The system includes a first antenna and a second antenna located on a top surface of the first aircraft, spaced apart along a first axis, as well as a third antenna and a fourth antenna located on a bottom surface of the first aircraft, spaced apart along a second axis orthogonal to the first axis. The system further includes a transmitting, receiving, and processing system coupled to the first, second, third, and fourth antennas, wherein the transmitting, receiving, and processing system is configured to transmit TCAS interrogations, receive TCAS replies, and process the TCAS replies to determine the relative bearing of the second aircraft from the first aircraft.

13 Claims, 5 Drawing Sheets

DISTRIBUTED AND CABLE REDUCED TCAS

PRIORITY CLAIM

This invention claims priority from U.S. Provisional Application No. 60/826,030, entitled "DISTRIBUTED AND CABLE REDUCED TCAS," filed Sep. 18, 2006 which is incorporated herein by reference.

BACKGROUND OF THE INVENTION

Current Traffic Alert Collision Avoidance (TCAS) installations are expensive. Dual TCAS installations are even more so because they require an extensive amount of cable and/or coaxial cable switches. Standard TCAS antennas also do not typically have a wide enough bandwidth to provide for integration of all L-band avionics equipment such as TCAS, Distance Measuring Equipment (DME) and transponder (XPDR) using the same antennas. U.S. Pat. No. 4,855,748, incorporated herein by reference describes a system and method for determining TCAS bearing estimation using a four element planar array antenna. TCAS installations typically use two such four element antennas, one on the top surface of an aircraft, and the other on the bottom surface of the aircraft. This typically requires a coaxial cable connection for each antenna element, resulting in at least eight total cables and an extensive number of coaxial cable switches. This results in considerable complexity and expense. U.S. Pat. No. 6,222,480, incorporated herein by reference, describes a system and method that integrates TCAS and XPDR functions. However, the system and method described in the '480 patent use a top four element antenna and a bottom four element antenna that results in extensive cable and coaxial switch requirements. Accordingly, there is a need for a TCAS antenna system that uses less cable and coaxial switches and is thus less expensive.

The '748 and '480 patents also use a single transmitting, receiving, and processing unit. This has the disadvantage of not offering any redundancy should the transmitting, receiving, and processing unit become damaged or malfunction. Accordingly, there is a further need for a TCAS system offering some level of redundancy.

SUMMARY OF THE INVENTION

The present invention includes a direction finding antenna system for determining the relative bearing of a second aircraft from a first aircraft in conjunction with a Traffic Alert Collision Avoidance System (TCAS), the second aircraft being equipped to transmit signals received by the antenna system. The system includes a first antenna and a second antenna located on a top surface of the first aircraft, spaced apart along a first axis, as well as a third antenna and a fourth antenna located on a bottom surface of the first aircraft, spaced apart along a second axis orthogonal to the first axis. The system also includes a transmitting, receiving, and processing system coupled to the first, second, third, and fourth antennas, wherein the transmitting, receiving, and processing system is configured to transmit TCAS interrogations, receive TCAS replies, and process the TCAS replies to determine the relative bearing of the second aircraft from the first aircraft.

In accordance with further aspects of the invention, the transmitting, receiving, and processing system is further configured to transmit transponder signals. In accordance with other aspects of the invention, the first, second, third, and fourth antennas are L-band blade antennas in an example embodiment. In accordance with still further aspects of the invention, the transmitting, receiving, and processing system includes a transmitter selectively coupled to at least one of the first, second, third, and fourth antennas, the transmitter configured to transmit TCAS interrogations omnidirectionally.

In accordance with yet other aspects of the invention, the transmitting, receiving, and processing system includes a line replaceable unit (LRU), the LRU including a receiver selectively coupled to the first, second, third, and fourth antennas. In accordance with still another aspect of the invention, the receiver includes a first phase detector for detecting the phase of signals received from the first antenna, a second phase detector for detecting the phase of signals received from the second antenna, a third phase detector for detecting the phase of signals received from the third antenna, and a fourth phase detector for detecting the phase of signals received from the fourth antenna.

In accordance with still further aspects of the invention, the transmitting, receiving, and processing system includes a first line replaceable unit (LRU) and a second LRU in signal communication with the first LRU. In accordance with yet other aspects of the invention, the first LRU includes a first receiver selectively coupled to the first antenna and the third antenna and the second LRU includes a second receiver selectively coupled to the second antenna and the fourth antenna. In accordance with still further aspects of the invention, the first receiver includes a first phase detector for detecting the phase of signals received from the first antenna and a second phase detector for detecting the phase of signals received from the third antenna. In an additional aspect of the invention, the first and second phase detectors also include a first amplitude detector and a second amplitude detector respectively for sensing the amplitude of signals received from the first antenna and the third antenna.

As will be readily appreciated from the foregoing summary, the invention provides a TCAS antenna system that uses less cabling than previous attempts. The invention further provides a TCAS antenna system with integrated TCAS and XPDR that uses less cabling than previous attempts. The invention still further provides a TCAS antenna system having distributed receiving and processing units and less cabling than previous attempts. This provides some redundancy so that if one of the transmitting, receiving, and processing units ceases to function properly, some functionality remains. In an example embodiment, a transmitter is present in each unit, and all transmission functionality remains if either unit ceases to function properly. However, in the example embodiment, some receiver functions are distributed between the two units such that if either unit ceases to function properly the function will be lost. For example, azimuth estimation of a received signal is a distributed function and will be lost if either unit ceases to function properly.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

In an embodiment, the invention uses 4 cables to implement a Traffic Alert Collision Avoidance System (TCAS) and uses standard L-band blade antennas. This simplifies L-band integration because the standard L-band blade handles TCAS, transponder (XPDR), and Distance Measuring Equipment (DME) frequencies. In an alternative embodiment, the TCAS receive function is distributed between two units that each have one receiver switched between two antenna ports. This further reduces the cost of the TCAS receive function. Although each unit is stated to include one receiver, it should be understood that each receiver includes a plurality of receiving components in some embodiments, with each component including a reception channel that is referred to as a receiver in some embodiments.

In an embodiment, TCAS surveillance is performed using an omnidirectional transmit pattern, thereby allowing the use of a standard L-Band transponder and/or DME antenna. TCAS bearing measurements are made by utilizing two L-band blade antennas on a top portion of an aircraft and two L-band blade antennas on a bottom portion of the aircraft. However, in other embodiments, a two element top antenna and a two element bottom antenna are used. This example implementation uses 4 TCAS cables. The two sets of L-band blades are orthogonally oriented. In an alternative embodiment, the TCAS receive function is distributed between two units where each unit is connected to one top and one bottom L-band blade. The two antenna blades on the top are mounted orthogonally to the two antenna blades on the bottom. In an additional embodiment, transponder functions are also integrated in the TCAS system by using the same antennas and DME functionality may use the same antennas as well.

Figure 1:
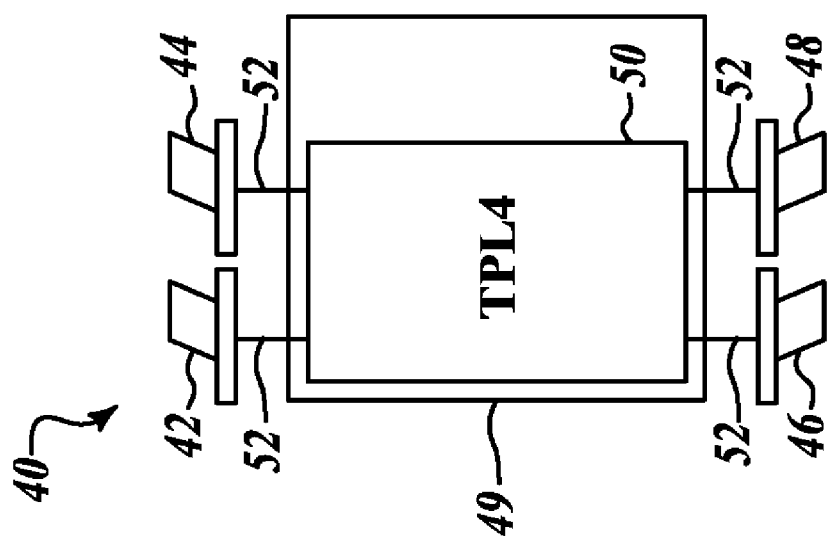
FIG. 1 is a high-level block diagram showing an antenna configuration for a TCAS system in accordance with an embodiment of the invention.

FIG. 1 is a high-level block diagram showing a TCAS system 40 formed in accordance with an embodiment of the invention. The system 40 includes a first top antenna 42, a second top antenna 44, a first bottom antenna 46, and a second bottom antenna 48. Each of the antennas 42, 44, 46, and 48 are connected to a transmitting, receiving, and processing system 49 by a cable 52, resulting in four total cables 52 for the system 40. The system 49 includes a Line Replaceable Unit (LRU) 50, designated as TPL4 that includes transmitting, receiving, and processing components.

When installed on an aircraft, the first top antenna 42 and the second top antenna 44 are positioned on a top surface of the aircraft, spaced apart along a first axis while the first bottom antenna 46 and the second bottom antenna 48 are positioned on a bottom surface of the aircraft, spaced apart along a second axis orthogonal to the first axis. In an example embodiment, the antennas 42, 44, 46, 48 are L-band blade antennas. In one example, an L-band blade antenna is any single element L-band antenna suitable for transponder or DME applications, and may be a simple, standard matched-quarter-wave stub antenna. In comparison to prior art systems using two four element array antennas, the system 40 shown in FIG. 1 gives a 50% port reduction, simplifies DME integration if using omnidirectional transmission, simplifies radio frequency (RF) systems required, transmits omnidirectionally, offers a simplified antenna configuration with fewer cables, and offers a potential size reduction. However, in other embodiments, the system 40 transmits TCAS interrogation signals by forming a beam using at least two of the antennas 42, 44, 46, and 48 rather than transmitting omnidirectionally.

Figure 2:
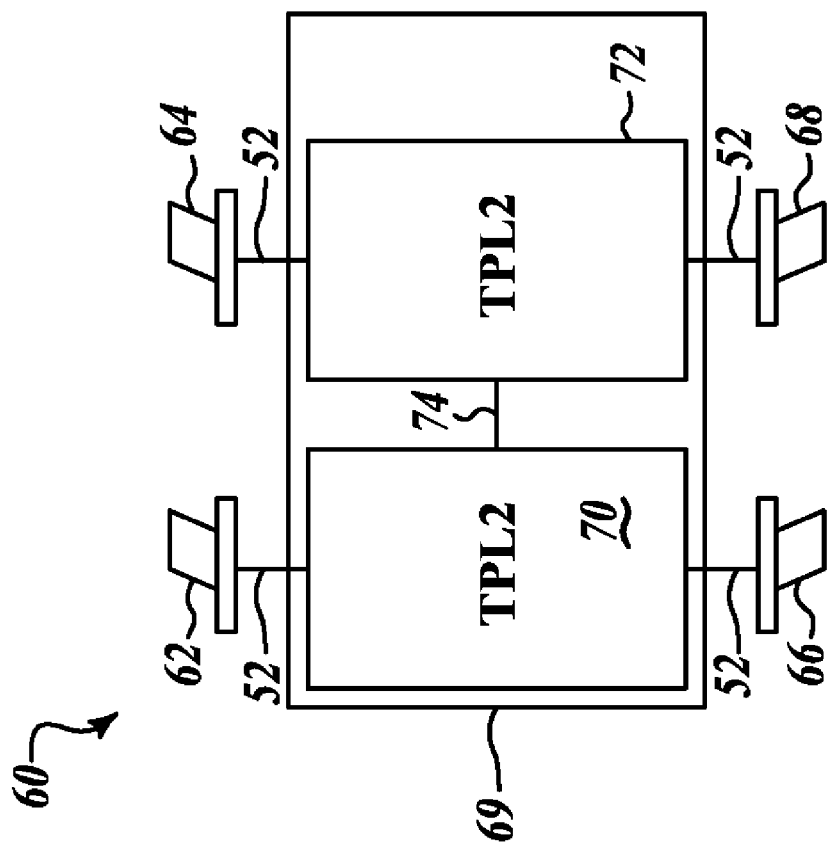
FIG. 2 is a high-level block diagram showing an antenna configuration for a TCAS system formed in accordance with an alternate embodiment of the invention.

FIG. 2 is a high-level block diagram showing a TCAS system 60 formed in accordance with an alternate embodiment of the invention. In similar fashion to the system 40, the system 60 includes a first top antenna 62, a second top antenna 64, a first bottom antenna 66, and a second bottom antenna 68 connected to a transmitting, receiving, and processing system 69 using four cables 52. As for the system 40, the first top antenna 62 and the second top antenna 64 are positioned on a top surface of an aircraft, spaced apart along a first axis while the first bottom antenna 66 and the second bottom antenna 68 are positioned on a bottom surface of the aircraft, spaced apart along a second axis orthogonal to the first axis. However, the system 69 is different from the system 49 in that the system 69 includes a first LRU 70 and a second LRU 72, each of the units 70, 72 designated as TPL2 and being connected to only two antennas. The first unit 70 is in signal communication with the second unit 72 over a communications link 74. Although the link 74 is shown as a single connection, multiple connection channels are present in an example embodiment.

The first unit 70 is connected to the antennas 62, 66 and the second unit 72 is connected to the antennas 64, 68. In an example embodiment, the antennas 62, 64, 66, 68 are L-band blade antennas. In one example, an L-band blade antenna is any single element L-band antenna suitable for transponder or DME applications, and may be a simple, standard matched-quarter-wave stub antenna. In comparison to prior art systems using two planar four element array antennas, the system 60 gives a 75% port reduction, simplifies DME integration, simplifies RF systems, transmits omnidirectionally, offers a simplified antenna configuration with fewer cables, offers a size reduction, and has a bearing supplied by dual units 70, 72. The system 60 also offers limited dual TCAS capability because the use of both the first unit 70 and the second unit 72 is only required for bearing determination, but not for range and altitude determination. Accordingly, if one of the units 70, 72 is lost due to damage, malfunctioning, or other reasons, bearing determination is lost but other functions are still operable.

Figure 3:
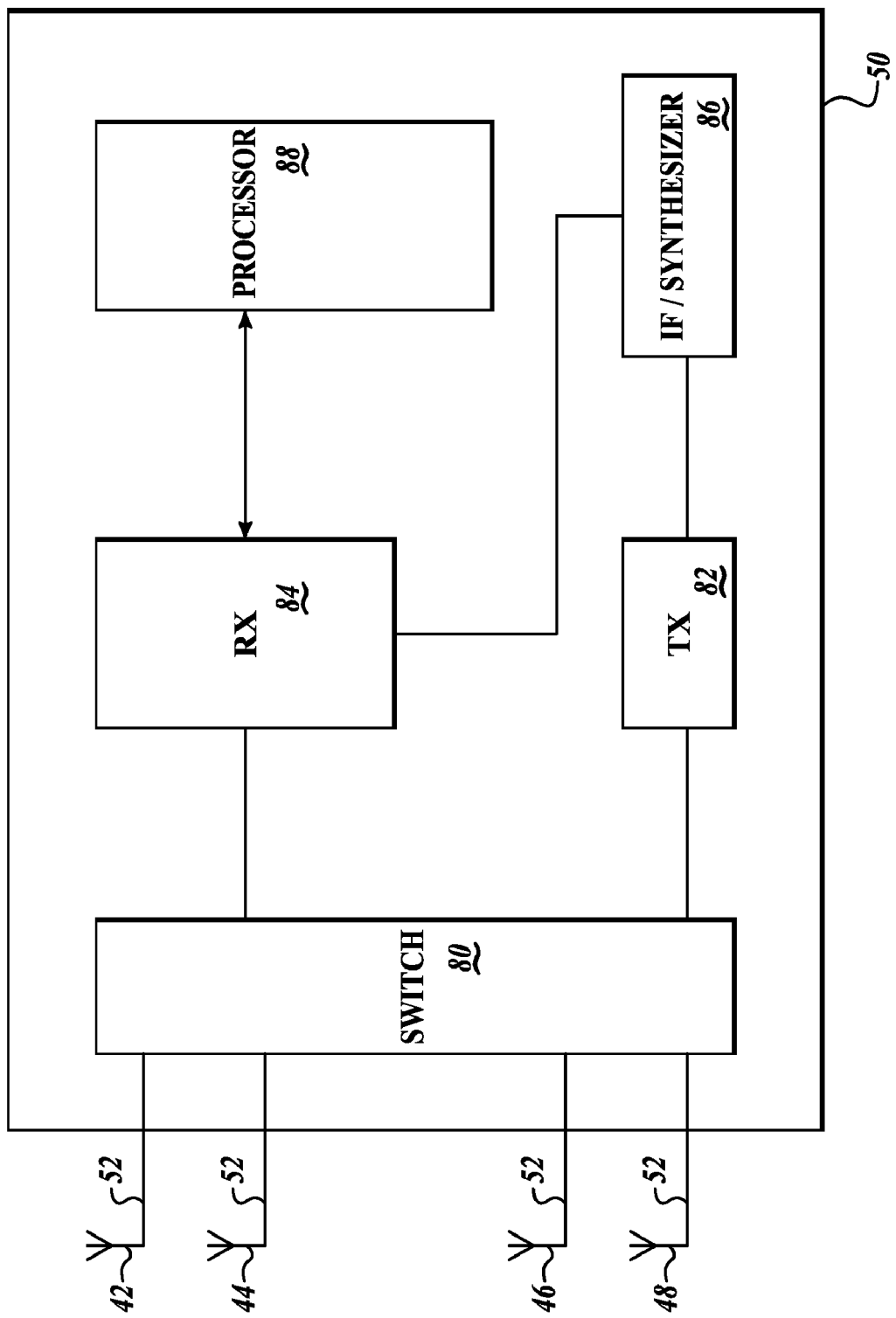
FIG. 3 is a block diagram showing additional detail for the embodiment shown in FIG. 1.

FIG. 3 is a block diagram showing additional detail for the LRU 50 shown in FIG. 2. In an example embodiment, the LRU 50 includes a switch 80 connected to a transmitter 82 and a receiver 84. In an example embodiment, the receiver 84 uses the methods described in U.S. Pat. No. 4,855,748 to determine bearing information. Although the connections between the switch 80 and the transmitter 82 and receiver 84 are shown as single links, multiple connections exist in an example embodiment. An intermediate frequency (IF)/synthesizer module 86 is in signal communication with both the transmitter 82 and the receiver 84. A processor 88 is in signal communication with the receiver 84. The switch 80 is used to selectively connect the antennas 42, 44, 46, and 48 to the transmitter 82 and the receiver 84.

Figure 4:
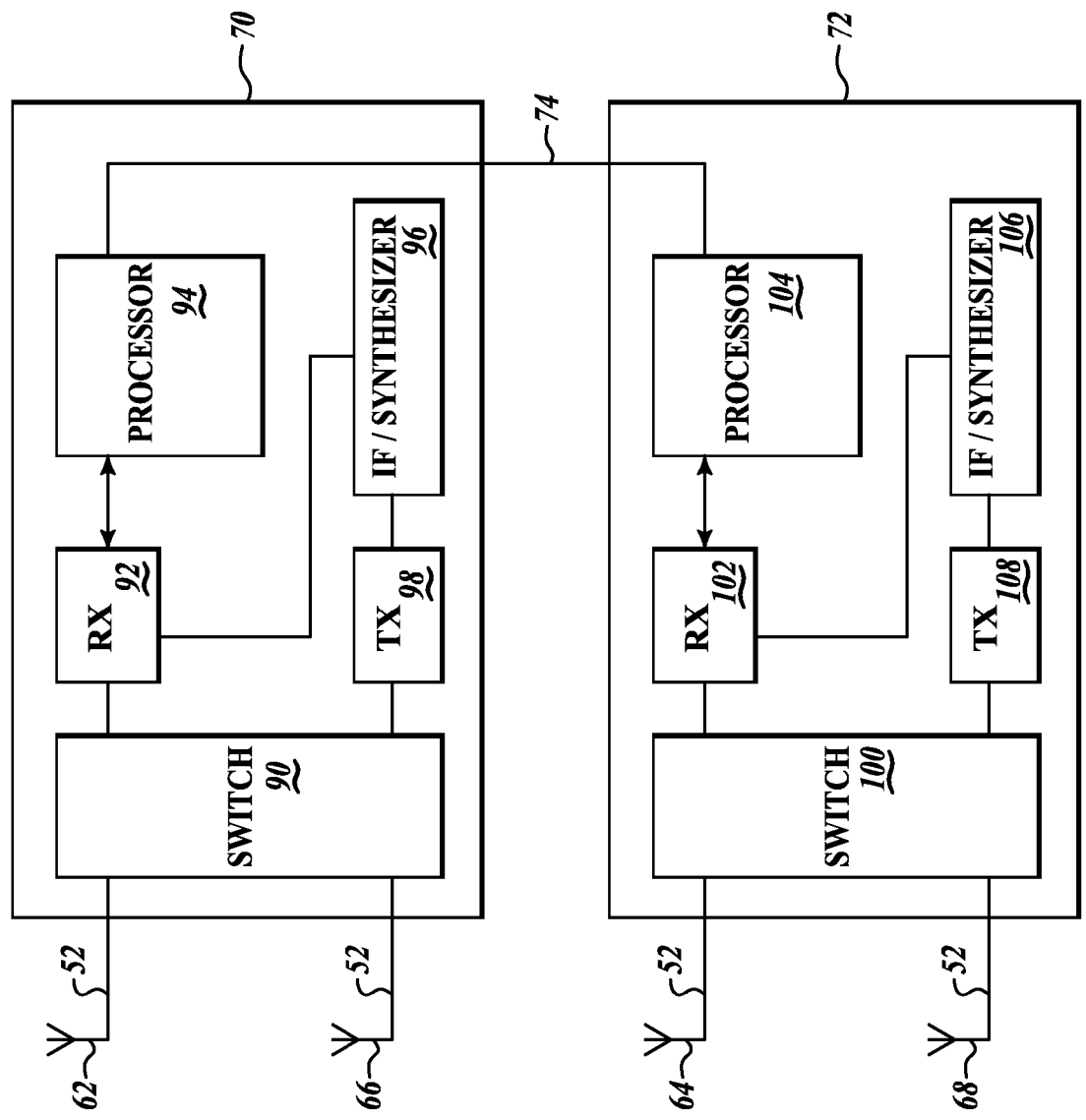
FIG. 4 is a block diagram showing additional detail for the alternate embodiment shown in FIG. 2.

FIG. 4 is a block diagram showing additional detail for the LRUs 70, 72 shown in FIG. 2. In an example embodiment, the LRU 70 includes a switch 90 connected to a receiver 92 that is in signal communication with a processor 94. The LRU 70 also includes an IF/synthesizer module 96 in signal communication with the receiver 92 and a transmitter 98. The transmitter 98 is also connected to the switch 90. The switch 90 is used to selectively connect the antennas 62, 66 to the receiver 92 and the transmitter 98. Similarly, the LRU 72 includes a switch 100 connected to a receiver 102 that is in signal communication with a processor 104. The LRU 72 also includes an IF/synthesizer module 106 in signal communication with the receiver 106 and a transmitter 108. The transmitter 108 is also connected to the switch 100. The switch 100 is used to selectively connect the antennas 64, 68 to the receiver 102 and the transmitter 108. The processor 94 is in signal communication with the processor 104 using the link 74. In an example embodiment, the receivers 92, 106 use the methods described in U.S. Pat. No. 4,855,748 to determine bearing information and one of the LRUs 70, 72 transmits interrogations, determines range, and decodes replies.

Figure 5:
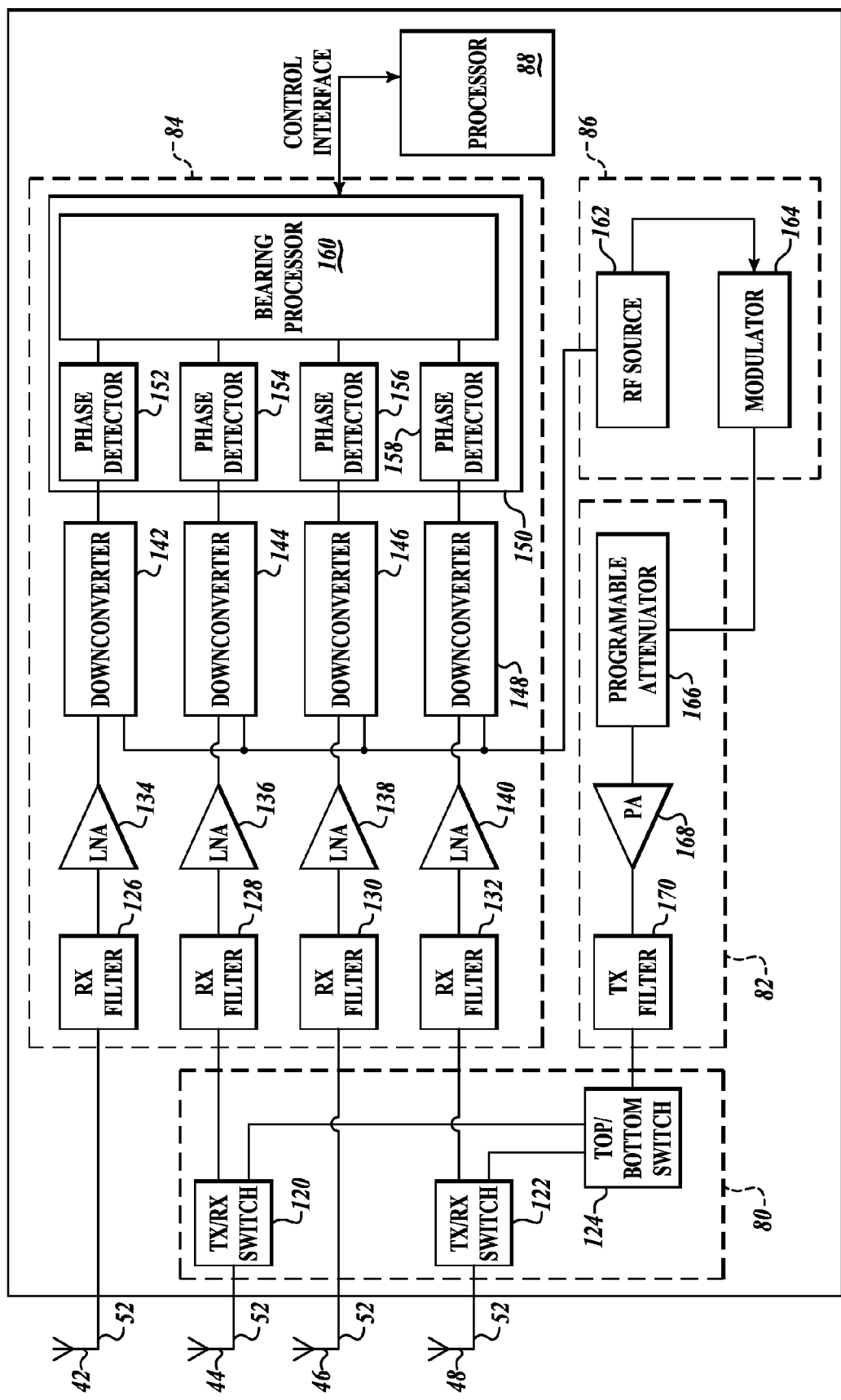
FIG. 5 is a block diagram showing additional detail for the embodiment shown in FIGS. 1 and 3.

FIG. 5 is a block diagram showing additional detail for the LRU 50 shown in FIGS. 1 and 3. In an example embodiment, the switch 80 includes a top TX/RX switch 120, a bottom TX/RX switch 122, and a Top/Bottom switch 124. The Top/Bottom switch 124 is used to selectively connect the transmitter 82 to the top TX/RX switch 120 or the bottom TX/RX switch 122. The TX/RX switches 120, 122 are used to selectively connect the antenna 44 and the antenna 48, respectively to the receiver 84 or the transmitter 82. In an example embodiment, the switches 120, 122, 124 are controlled by the processor 88 (connections not shown).

The receiver 84 includes a first RX filter 126 whose input is connected to the first top antenna 42, a second RX filter 128 whose input is connected to the top TX/RX switch 120 so that it may be selectively connected to the second top antenna 44, a third RX filter 130 whose input is connected to the first bottom antenna 46, and a fourth RX filter 132 whose input is connected to the bottom TX/RX switch 122 so that it may be selectively connected to the second bottom antenna 48. Each of the RX filters 126, 128, 130, and 132 has its output connected to the input of a Low Noise Amplifier (LNA) 134, 136, 138, 140 respectively. The outputs of the LNAs 134, 136, 138, 140 are connected to one of two inputs of a down converter 142, 144, 146, 148 respectively. The other input to the down converters 142, 144, 146, 148 is received from an output of the IF/synthesizer module 86.

Each output from the down converters 142, 144, 146, 148 then passes into a detection and bearing processing component 150. The detection and bearing processing component 150 includes first, second, third, and fourth phase detectors 152, 154, 156, and 158 respectively. Each phase detector 152, 154, 156, 158 takes as its input, the output of the down converters 142, 144, 146, 148 respectively. The outputs of the phase detectors 152, 154, 156, 158 are then used as inputs to a bearing processor 160. The detection and bearing processing component 150 is also in signal communication with the processor 88 so that the output of the bearing processor 160 may be used by the processor 88 for further processing and display, and so the processor 88 is able to provide control signals to the receiver 84. Although not shown for clarity, alternative embodiments include first, second, third, and fourth signal amplitude detectors that are used in conjunction with the phase detectors 152, 154, 156, and 158 in an example embodiment to provide additional information used by the bearing processor 160 in determining bearing.

The IF/Synthesizer module 86 includes a radiofrequency (RF) source 162 in signal communication with a modulator 164. An output of the RF source 162 is used as an input to the down converters 142, 144, 146, and 148. An output of the modulator 164 is used as an input to the transmitter 82. The transmitter 82 includes a programmable attenuator 166 whose input is received from the modulator 164 output. The output of the programmable attenuator 166 next passes to the input of a power amplifier (PA) 168. The output of the PA 168 is in signal communication with the input of a TX filter 170, whose output is connected to the Top/Bottom switch 124.

Figure 6:
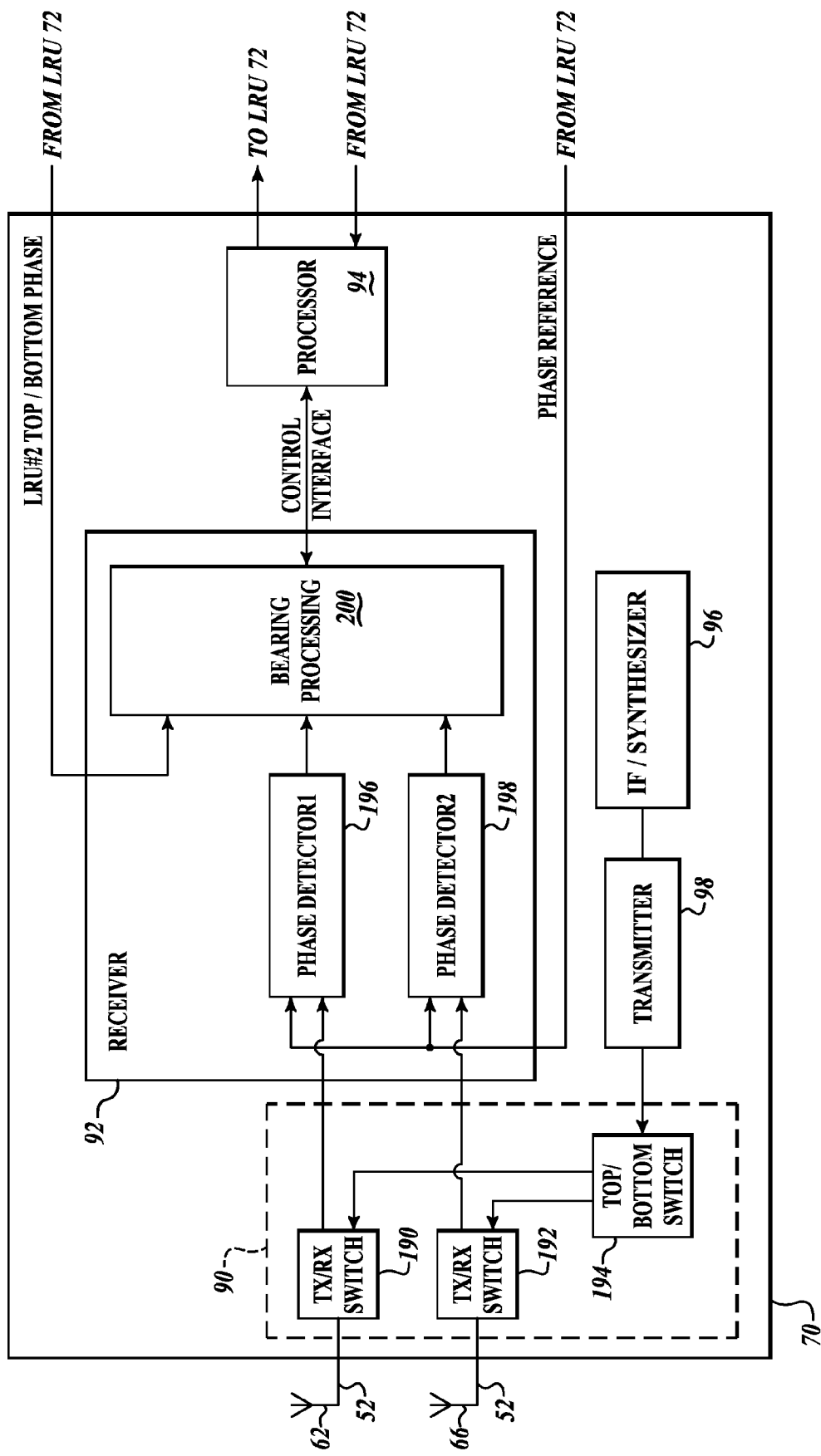
FIG. 6 is a block diagram showing additional detail for the embodiment shown in FIGS. 2 and 4.

FIG. 6 is a block diagram showing additional detail for the LRU 70 shown in FIGS. 2 and 4. In an example embodiment, the switch 90 includes a top TX/RX switch 190, a bottom TX/RX switch 192, and a Top/Bottom switch 194. The Top/Bottom switch 194 is used to selectively connect the transmitter 98 to the top TX/RX switch 190 or the bottom TX/RX switch 192. The TX/RX switches 190, 192 are used to selectively connect the first top antenna 62 and the first bottom antenna 66, respectively to the receiver 92 or the transmitter 98. In an example embodiment, the switches 190, 192, 194 are controlled by the processor 94 (connections not shown).

The receiver 92 includes a first phase detector 196 and a second phase detector 198. A first input of the first phase detector 196 is selectively connected to the first top antenna 62 by the top TX/RX switch 190. In similar fashion, a first input of the second phase detector 198 is selectively connected to the first bottom antenna 66 by the bottom TX/RX switch 192. In an example embodiment, filtering, amplification, and down conversion stages (not shown) are present between the switches 190, 192 and the phase detectors 196, 198 in similar fashion to those shown in FIG. 5 for the system 40. Each of the phase detectors 196, 198 also receives a second input from the second unit 72, such as a phase reference signal from the processor 104 over the communications link 74, for example.

The outputs of the phase detectors 196, 198 are then used as inputs to a bearing processor 200. The bearing processor 200 also receives as inputs the top and bottom phases from the second top antenna 64 and the second bottom antenna 68, received from the second unit 72 over the link 74, for example. The bearing processor 200 is also in signal communication with the processor 94 so that the output of the bearing processor 200 may be used by the processor 94 for further processing and display, and so the processor 94 is able to provide control signals to the receiver 92. The processor 94 is also in signal communication with the processor 104 of the second unit 72 over the link 74. The second unit 72, although not shown in FIG. 6, is configured similarly to the first unit 70.

An output of the IF/Synthesizer module 96 is used as an input to the transmitter 98. In an example embodiment, the IF/Synthesizer module 96 includes a radiofrequency (RF) source in signal communication with a modulator (both not shown) with an output of the RF source being used as an input to down converters (not shown) used in the receiver 92 in similar fashion to those shown in FIG. 5 for the system 40. An output of the transmitter 82 is connected to the Top/Bottom switch 194. In an example embodiment, the transmitter 82 includes a programmable attenuator and a power amplifier (both not shown) in similar fashion to those shown in FIG. 5 for the system 40.

While the preferred embodiment of the invention has been illustrated and described, as noted above, many changes can be made without departing from the spirit and scope of the invention. For example, rather than using L-band blade antennas, L-band antennas integrated into skin surfaces of an aircraft could be used in some embodiments. Additionally, a top two-element antenna and a bottom two-element antenna are used in some embodiments, with the first antenna being replaced by the first element of the top two-element antenna, the second antenna being replaced by the second element of the top two-element antenna, the third antenna being replaced by the first element of the bottom two-element antenna, and the fourth antenna being replaced by the second element of the bottom two-element antenna. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A direction finding antenna system located on a first aircraft for determining the relative bearing of a second aircraft from the first aircraft in conjunction with a Traffic Alert Collision Avoidance System (TCAS), the second aircraft being equipped to transmit signals received by the antenna system, the system comprising:
   a first antenna and a second antenna located on a top surface of the first aircraft, spaced apart along a first axis;
   a third antenna and a fourth antenna located on a bottom surface of the first aircraft, spaced apart along a second axis orthogonal to the first axis; and
   a transmitting, receiving, and processing system coupled to the first, second, third, and fourth antennas,
   wherein the transmitting, receiving, and processing system is configured to transmit TCAS interrogations, receive TCAS replies, and process the TCAS replies to determine the relative bearing of the second aircraft from the first aircraft, wherein the transmitting, receiving, and processing system includes a transmitter selectively coupled to at least one of the first, second, third, and fourth antennas, the transmitter configured to transmit TCAS interrogations omnidirectionally, and wherein each of the first antenna, the second antenna, the third antenna, and the fourth antenna have only a single element.

2. The system of claim 1, wherein the transmitting, receiving, and processing system is further configured to transmit transponder signals.

3. The system of claim 1, wherein the first, second, third, and fourth antennas are L-band blade antennas.

4. The system of claim 1, wherein the transmitter is further configured to transmit TCAS interrogations by generating a directional beam using at least two of the first, second, third, and fourth antennas.

5. The system of claim 1, wherein the transmitting, receiving, and processing system includes a line replaceable unit (LRU), the LRU including a receiver selectively coupled to the first, second, third, and fourth antennas.

6. The system of claim 5, wherein the receiver includes a first detector for detecting an aspect of signals received from the first antenna, a second detector for detecting an aspect of signals received from the second antenna, a third detector for detecting an aspect of signals received from the third antenna, and a fourth detector for detecting an aspect of signals received from the fourth antenna.

7. The system of claim 6, wherein the first, second, third, and fourth detectors each include a phase detector for detecting the phase of signals received from the first, second, third, and fourth antennas respectively.

8. The system of claim 7, wherein the first, second, third, and fourth detectors each include an amplitude detector for detecting the amplitude of signals received from the first, second, third, and fourth antennas respectively.

9. The system of claim 1, wherein the transmitting, receiving, and processing system comprises:
   a first line replaceable unit (LRU); and
   a second LRU in signal communication with the first LRU wherein the first and second LRUs are configured to process bearing information in a distributed manner.

10. The system of claim 9, wherein the first LRU includes a first receiver selectively coupled to the first antenna and the third antenna and the second LRU includes a second receiver selectively coupled to the second antenna and the fourth antenna.

11. The system of claim 10, wherein the first receiver includes a first phase detector for detecting the phase of signals received from the first antenna and a second phase detector for detecting the phase of signals received from the third antenna.

12. A direction finding antenna system located on a first aircraft for determining the relative bearing of a second aircraft from the first aircraft in conjunction with a Traffic Alert Collision Avoidance System (TCAS), the second aircraft being equipped to transmit signals received by the antenna system, the system comprising:
   a first two-element antenna located on a top surface of the first aircraft, having only a first element and a second element spaced apart along a first axis;
   a second two-element antenna located on a bottom surface of the first aircraft, having only a first element and a second element spaced apart along a second axis orthogonal to the first axis; and
   a transmitting, receiving, and processing system coupled to the first and second antennas,
   wherein the transmitting, receiving, and processing system is configured to transmit TCAS interrogations, receive TCAS replies, and process the TCAS replies to determine the relative bearing of the second aircraft from the first aircraft and wherein the transmitting, receiving, and processing system includes a transmitter selectively coupled to at least one of the first, second, third, and fourth antennas, the transmitter configured to transmit TCAS interrogations omnidirectionally.

13. The system of claim 12, wherein the transmitting, receiving, and processing system is further configured to transmit transponder signals.

* * * * *